United States Patent Office 3,290,497
Patented Dec. 6, 1966

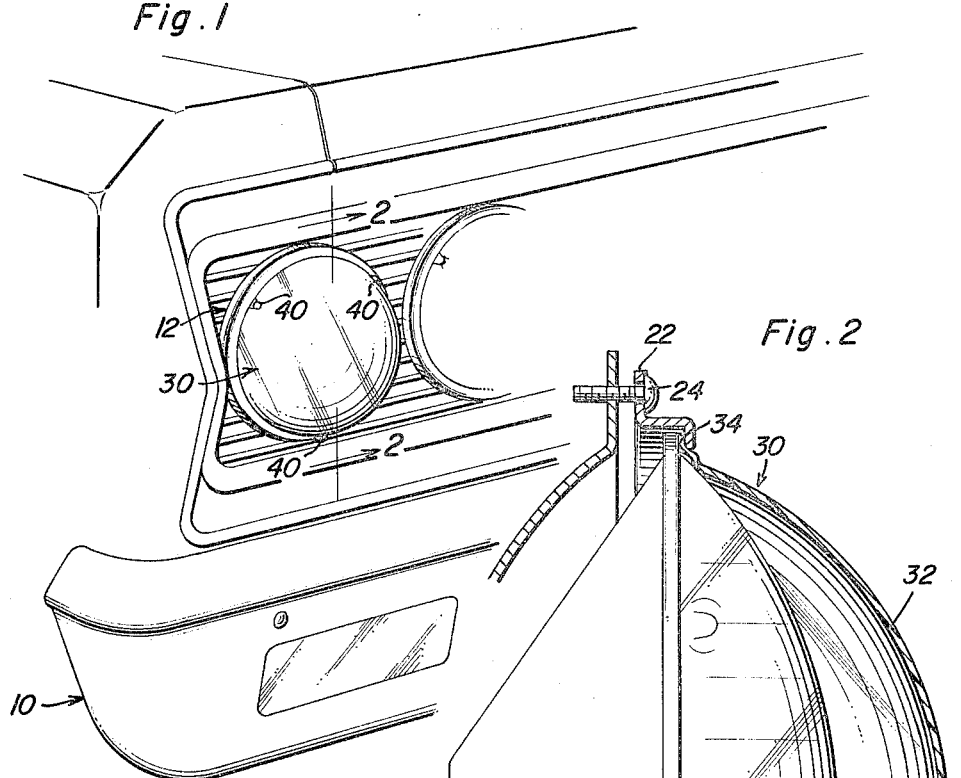
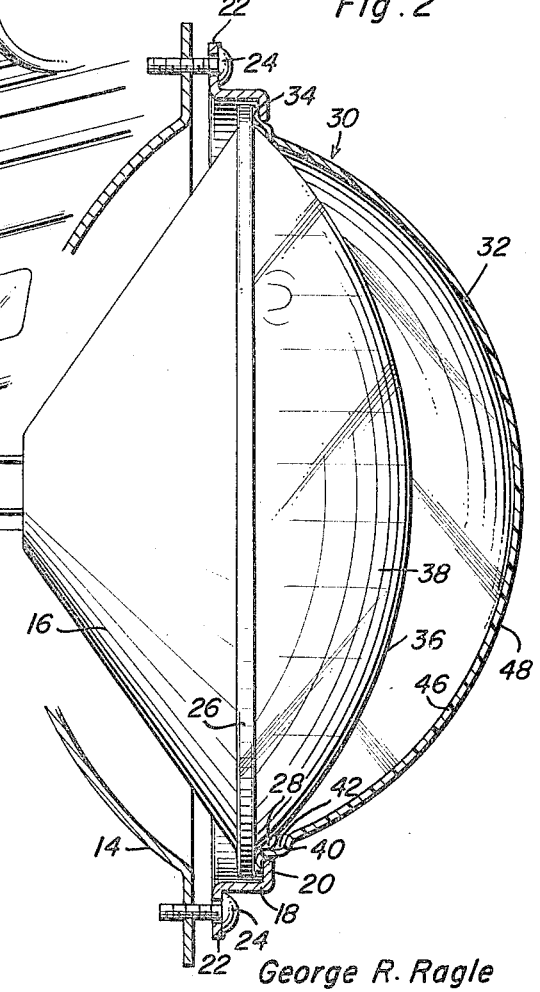
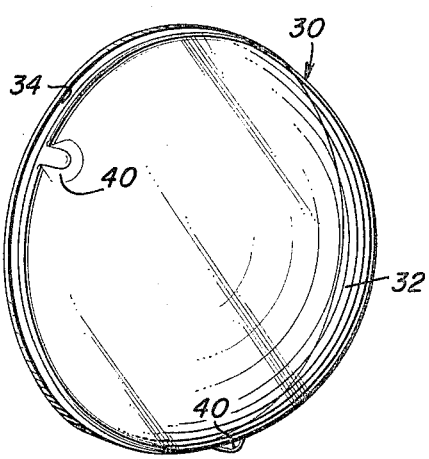
George R. Ragle
Gerald R. Ragle
INVENTORS

3,290,497
HEADLIGHT PROTECTOR
George R. Ragle and Gerald R. Ragle, both of
Box 1256, Plainview, Tex.
Filed Sept. 4, 1964, Ser. No. 394,418
2 Claims. (Cl. 240—46.55)

This invention relates to a novel and useful headlight protector and more specifically to an attachment which is adapted to be secured over the lens of a conventional sealed beam headlight. The headlight protector is generally semi-spherical in configuration and has a radius of curvature less than the radius of curvature of the lens of a conventional sealed beam unit whereby only the marginal edge portions of the headlight protector will engage the lens face of the sealed beam unit to which it is secured and the center portion of the protector will be disposed in spaced relation relative to the corresponding headlight lens.

The headlight protector attachment of the instant invention is constructed of transparent material, either clear or tinted, and certain types of plastics may be used in the construction of the protector attachment with optimum results obtained thereby.

Although in most instances the headlight protector will be constructed of clear plastic, plastic tinted with yellow pigment or other colored pigment may be utilized in the construction of the headlight protector when the latter is to be used in specific environments.

Although many types of headlight protectors have heretofore been designed, many of these previously known devices have included cumbersome and at best at least partially ineffective means for securing the headlight protector to an associated headlight assembly such as a sealed beam unit. Accordingly, it is the main object of this invention to provide a headlight protector constructed in a manner whereby it may be readily secured to substantially all types of sealed beam units presently in use without the requirement of any special part other than the protector itself.

Another object of this invention, in accordance with the immediately preceding object, is to provide a headlight protector designed in a manner whereby it may be secured over the lens portion of a sealed beam unit by means of the conventional cylindrical retaining rings now commonly utilized to seatingly secure sealed beam units in sockets adjustably supported from an associated vehicle.

Yet another object of this invention is to provide a headlight protector attachment of the aforementioned type including means for engaging the outer peripheral portion of the lens of an associated sealed beam unit and further means for providing clearance for aiming "gizmos" formed on an associated sealed beam unit.

A final object of this invention to be specifically enumerated herein is to provide a headlight protector in accordance with the preceding objects which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the right front corner portion of a conventional form of passenger motor vehicle shown with the headlight protector attachment of the instant invention opertaively mounted on the outboard sealed beam unit of the passenger vehicle;

FIGURE 2 is an enlarged fragmentary vertical sectional view taken substantially upon the plane indicated by section line 2—2 of FIGURE 1; and FIGURE 3 is a perspective view of the headlight protector attachment of the instant invention.

Referring now more specifically to the drawings, the numeral 10 generally designates a conventional form of motor vehicle including a headlight assembly generally referred to by the reference numeral 12 comprising a socket assembly 14 which is adjustably supported from an appropriate portion of the body of the motor vehicle 10 in any conventional manner and a sealed beam unit 16 secured to the socket assembly 14 by means of a conventional retaining ring 18.

The retaining ring is generally cylindrical and includes a forward inturned and generally radially extending circumferential retaining flange 20. The rear end of the retaining ring 18 includes radially outwardly directed apertured mounting flange portions 22 which are spaced circumferentially about the retaining ring 18 and are secured to the socket assembly 14 by means of suitable fasteners 24 secured through the mounting flange portions 22 and threadedly engaged with the socket assembly 14.

The foregoing description describes the structure of conventional headlight assemblies and it may be seen that the sealed beam unit 16 includes a radially outwardly projecting circumferential abutment flange 26 with which the retaining flange 20 is engageable to secure the sealed beam unit 16 within the socket assembly 14. In addition, it may be seen that the sealed beam unit 16 includes a plurality of circumferentially spaced and axially projecting aiming "gizmos" 28. These "gizmos" are a fairly recent development and are utilized by some newer types of of headlight aiming machines to properly aim the headlight of a motor vehicle.

The headlight protector of the instant invention is generally referred to by the reference numeral 30 and comprises a generally semi-spherical member 32 which may be constructed of transparent plastic. The outer peripheral portion of the semi-spherical member 32 includes radially outwardly directed circumferential flange 34 and it may be seen that the annulus defined by the circumferential flange 34 is a size corresponding to the annulus defined by the abutment flange 26 and therefore that the flange 34 may abut against the forward face of the abutment flange 26 as illustrated in FIGURE 2 of the drawings. Inasmuch as the circumferential flange 34 is relatively thin and the threaded fasteners 24 are of a length adapted to more than compensate for the extra thickness of the flange 34, the retaining ring 18 may be utilized, not only to secure the sealed beam units 16 within the socket assembly 14, but to also secure the transparent member 32 over the front face 36 of the lens 38 of the sealed beam unit 16.

The transparent member 32 includes a plurality of forwardly projecting bulges 40 which are spaced circumferentially thereabout and it will be noted that each of the bulges 40 defines a rearwardly opening socket 42 in which the corresponding aiming "gizmo" is receivable. Accordingly, the transparent member 32 may be readily secured over the front face 36 of the lens 38 merely by removing the retaining flange 20, placing the transparent member 32 over the lens 38, and then reinstalling the retaining flange 20.

As hereinbefore set forth, the radius of curvature of the generally semi-spherical transparent member 32 is less than the radius of curvature of the lens 38 thereby enabling the outer peripheral edge portions of the transparent member 32 to engage the abutment flange 26 while the center portion of the transparent member 32 is disposed in spaced relation relative to the center of the lens 38.

The inner and outer surfaces 46 and 48 of the transparent member 32 are smooth and polished so as to minimize any diffusion of the light produced by the sealed beam unit 16. Further, corresponding portions of the inner and outer surfaces 46 and 48 parallel each other and thereby retain refraction or diffusion of the rays of light emanating from the sealed beam unit 16 to a minimum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a headlight assembly of the type including a forwardly opening and adjustably mounted socket assembly; a sealed beam unit disposed in said socket assembly and having a forwardly facing generally semi-spherical lens of substantially constant radius of curvature and whose outer edge portion terminates in a generally radially and circumferentially extending abutment flange projecting outwardly therefrom; a generally cylindrical retaining ring snugly enclosing said abutment flange, including a radially inwardly directed retaining flange at its forward end extending circumferentially thereabout and overlying the forward face of said abutment flange, and provided with radially outwardly directed mounting flange portions on its other end secured to said socket assembly by means of threaded fasteners passed through openings in said mounting flange portions provided therefor and threadedly engaged with said socket assembly; a headlight protector comprising a forwardly convex transparent and generally semi-spherical member of substantially constant radius of curvature disposed forwardly of and in horizontal alignment with said sealed beam unit and including a generally radially outwardly projecting circumferential flange on its open end disposed within said ring and between said abutment and retaining flanges; the radius of curvature of the concave surface of said protector being less than the radius of curvature of the outer surface of said sealed beam unit lens and the concave surface of said protector having its outer peripheral portions disposed in abutting engagement with the corresponding outer surface portion of said lens immediately inwardly of said abutment flange whereby the center of said protector is spaced forwardly of the center of said lens and the spacing between said protector and said lens gradually decreases from the center of said protector to said outer peripheral portions thereof; said retaining ring, by means of said fasteners and said retaining flange, serving to clampingly embrace said circumferential flange on said protector between said retaining flange and said abutment flange.

2. The combination of claim 1 wherein the outer peripheral portions of said transparent member disposed adjacent but inwardly of said circumferential flange include circumferentially spaced outwardly and axially projecting bulges defining inwardly opening recesses opening toward said lens and loosely receiving aiming "gizmos" formed on said lens and spaced circumferentially thereabout.

References Cited by the Examiner

UNITED STATES PATENTS

| 2,107,801 | 2/1938 | Query | 240—46.59 |
| 2,499,555 | 3/1950 | Wronkowski | 240—46.59 |
| 2,823,300 | 2/1958 | Graubner | 240—46.59 X |
| 3,032,646 | 5/1962 | Chieger | 240—46.59 X |
| 3,191,025 | 6/1965 | Harker | 240—46.59 X |

JOHN M. HORAN, *Primary Examiner.*

NORTON ANSHER, *Examiner.*

C. R. RHODES, *Assistant Examiner.*